United States Patent [19]
Engel

[11] 4,227,969
[45] * Oct. 14, 1980

[54] OIL RECLAMATION DEVICE

[76] Inventor: Gary C. Engel, 123 N.W. 109th St., Miami Shores, Fla. 33168

[*] Notice: The portion of the term of this patent subsequent to Feb. 19, 1997, has been disclaimed.

[21] Appl. No.: 8,127

[22] Filed: Jan. 31, 1979

Related U.S. Application Data

[63] Continuation of Ser. No. 852,976, Nov. 18, 1977, Pat. No. 4,189,351.

[51] Int. Cl.³ .................. B01D 3/28; B01D 35/18; C10G 7/00
[52] U.S. Cl. .................. 196/115; 196/46.1; 210/180; 210/184; 208/179
[58] Field of Search .............. 196/115, 121, 128, 46.1; 210/180, 184, 446; 208/179

[56] References Cited

U.S. PATENT DOCUMENTS

| | | | |
|---|---|---|---|
| 2,425,377 | 8/1947 | LaBrecque | 196/46.1 |
| 3,616,885 | 11/1971 | Priest | 196/46.1 X |
| 4,006,084 | 2/1977 | Priest | 196/46.1 X |
| 4,093,548 | 6/1978 | Sterkenburg et al. | 196/46.1 X |
| 4,115,201 | 9/1978 | Malec | 196/128 X |

*Primary Examiner*—Frank W. Lutter
*Assistant Examiner*—Roger F. Phillips
*Attorney, Agent, or Firm*—Neil F. Markva

[57] ABSTRACT

An oil reclamation device comprises a housing, filter, evaporator plate and heating assembly. The housing has a longitudinal axis and includes an oil inlet to receive oil to be reclaimed and an oil outlet to discharge reconditioned oil. The filter is disposed at one end of the housing to define a mechanical filtration zone which receives the oil from the oil inlet of the device. The evaporator plate is disposed within the housing adjacent the mechanical filtration zone. The heating assembly is disposed at the open end of the housing adjacent the evaporator plate to define an evaporation chamber therebetween. The evaporator plate includes upwardly projecting evaporation walls defining a plurality of curved vaporizing surfaces laterally displaced radially with respect to each other to form a fluid traveling surface therebetween. The heating assembly includes downwardly projecting heating walls defining a plurality of curved heating surfaces located between the curved vaporizing surfaces. The evaporation walls and the heating walls define a plurality of curved paths along the fluid traveling surface from the longitudinal axis of the housing outwardly along the evaporator plate. Evaporator plate includes passageways extending from the mechanical filtration zone to deliver substantially all of the oil being treated at a centermost portion of the evaporator plate. The evaporation walls and the heating walls provide a structural configuration effective to guide the oil from the centermost portion of the plate outwardly along the curved paths to the oil outlet of the housing.

22 Claims, 7 Drawing Figures

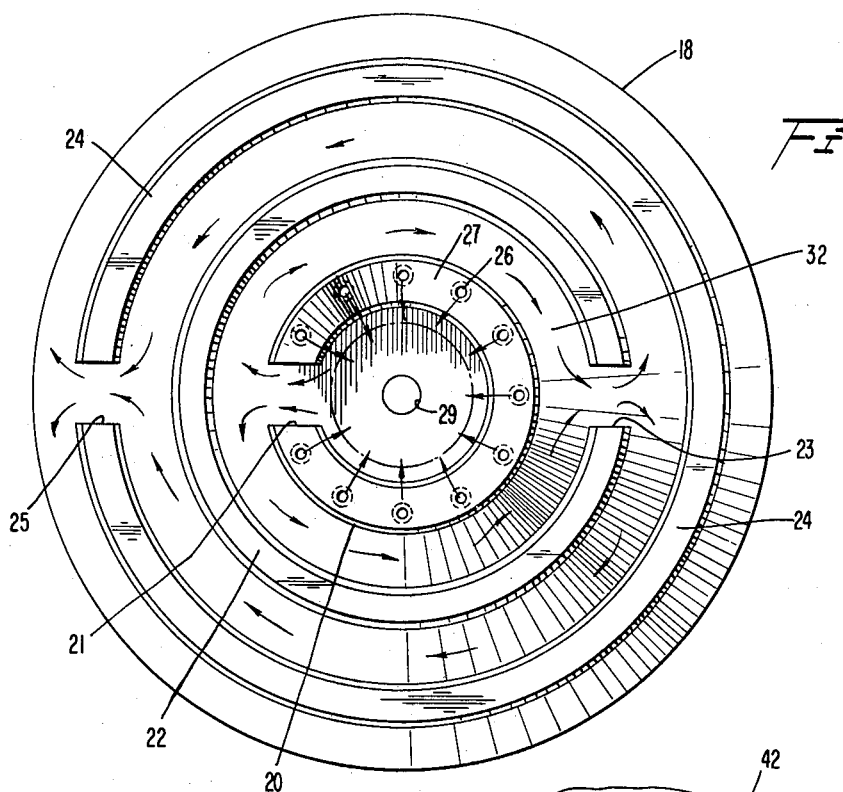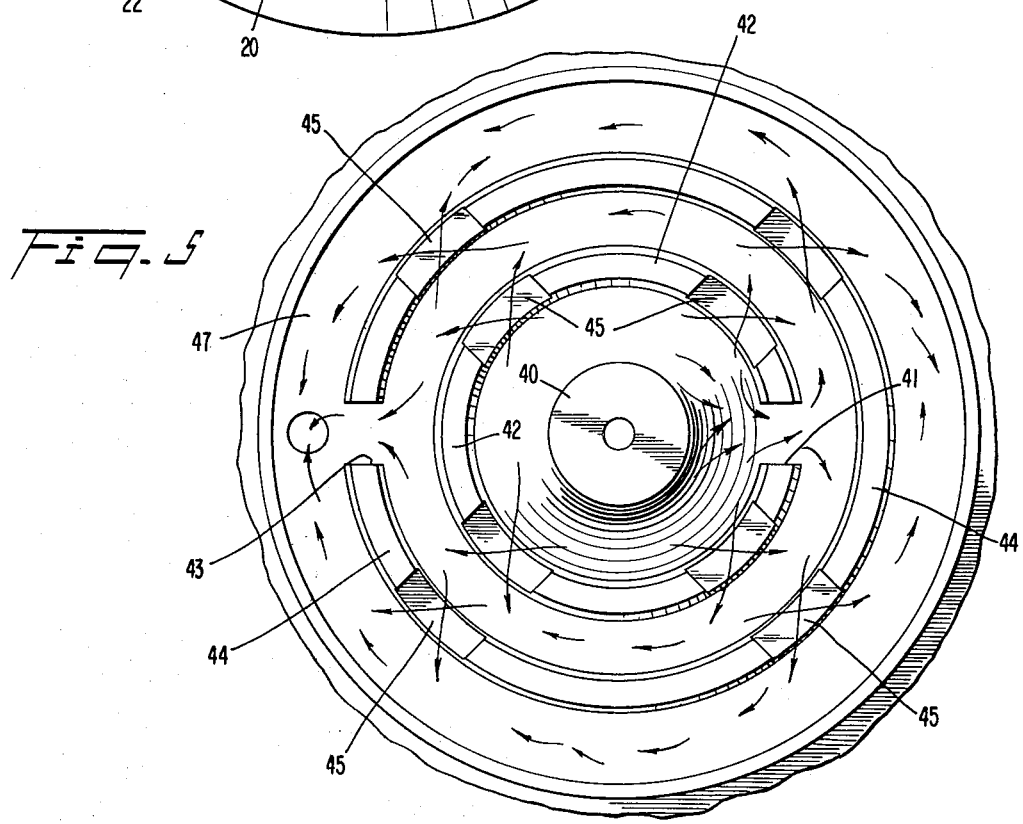

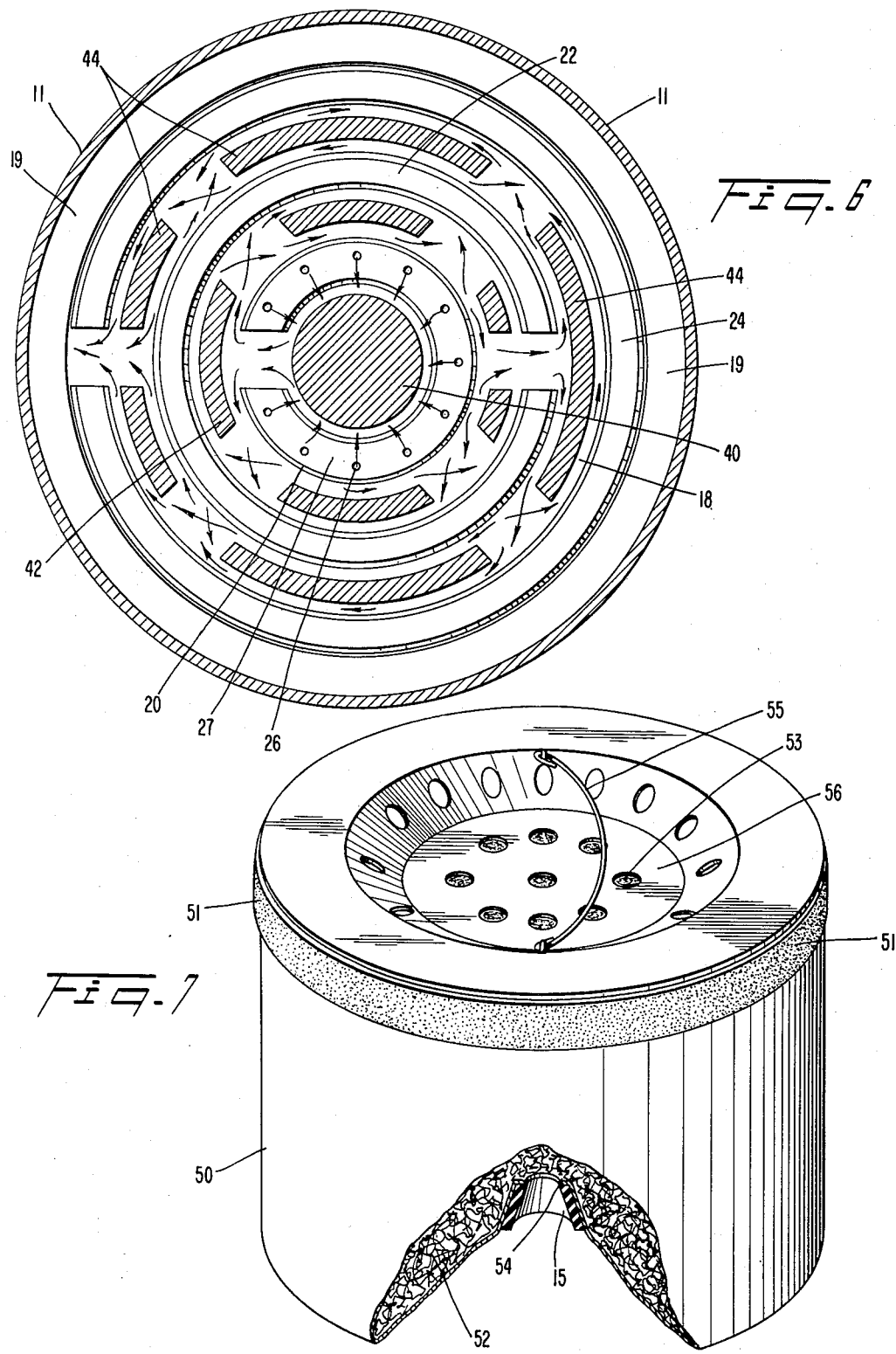

OIL RECLAMATION DEVICE

This is a continuation, of application Ser. No. 852,976, filed Nov. 18, 1977 now U.S. Pat. No. 4,189,351.

BACKGROUND OF THE INVENTION

This invention relates to oil reclamation devices which are used with internal combustion engines to remove solid contaminates and water or other volatile contaminates from the engine lubricating oils. More particularly, the invention relates to a unique evaporation chamber configuration and a unique filter assembly.

Oil reclamation devices of the type disclosed and described herein are generally well known. These devices are used to remove both solid and liquid contaminates from the lubricating oil. It is well known that oil in and of itself does not "wear out." Once the solid and vapor contaminates are removed therefrom, the oil is substantially reconditioned and remains in a most useful state.

U.S. Pat. Nos. 2,839,196, 3,616,885 and 3,915,860 disclose generally the state of the prior art structures of this type. Peru Patent 13849 dated Feb. 28, 1975, also discloses an oil reclamation device of the type described herein. The oil being treated is introduced in these known devices over the expanse of the evaporator plate into the evaporation chamber. This has been found to be greatly inefficient because not all of the oil is treated in substantially the same way with similar conditions. That is, the amount of exposure to heat in the evaporation chamber cannot be controlled. Furthermore, the amount of oil moving through the passageways in the evaporator plate cannot be controlled in such a configuration.

In the instance where there are downwardly extending fins, as shown in the Peruvian patent, the resultant structure does not in any way control the flow of the oil being treated in the evaporation chamber. It has been found that if there is a slight tipping of the overall device upon installation, that the operation of the reclamation assembly is extremely inefficient.

PURPOSE OF THE INVENTION

The primary object of the invention is to provide a highly efficient and easily maintainable structure for an oil reclamation device having a filter assembly and an evaporation chamber for removing solid and liquid contaminates from lubricating oils.

Another object of the invention is to provide an evaporation chamber in an oil reclamation device which results in a significantly controlled flow of oil being treated.

A further object of the invention is to expose substantially all of the oil to substantially uniform mechanical filtration and evaporation treatment.

A still further object of the invention is to provide an evaporator plate and a heat transmitting member having interacting portions which contribute to establish a uniformity in heating and a uniformity with respect to the fluid flow through the evaporation chamber.

It is still a further object of this invention to provide a filter assembly which will obviate problenms associated with the disposition of fibrous material as it is provided in prior art oil reclamation devices.

SUMMARY OF THE INVENTION

The oil reclamation device comprises a housing means, filter means, evaporator plate means and heating means. The improvement comprises an evaporator plate means having upwardly projecting evaporation wall means defining a plurality of curved vaporizing surfaces laterally displaced radially with respect to each other to form a fluid traveling surface therebetween. The heating means includes heat transmitting means having downwardly projecting heating wall means defining a plurality of curved heating surfaces located between the curved vaporizing surfaces. The evaporation wall means and the heating wall means define a plurality of curved paths along the fluid traveling surface from the longitudinal axis of the device outwardly along the evaporator plate means.

The evaporator plate means includes passageways extending from the mechanical filtration zone defined by the filter means to deliver substantially all of the oil being treated at a centermost portion of the plate means. The evaporator wall means and the heating wall means provide a structural configuration effective to guide the oil from the centermost portion outwardly along the curved paths to an oil outlet means of the housing means.

A further improvement is directed to the filter means which includes fibrous filter material disposed within a canister means. The canister means has a structural configuration to removably fit into the housing means and receive substantially all of the oil to be treated entering the reclamation device through an oil inlet means of the system. The canister means has a bottom end portion, a side wall portion and an upper end portion. The canister means includes means for receiving oil at the bottom end portion and means for discharging oil from the fibrous filter material at the upper end portion. The canister means is composed of a fluid impervious material to provide the only path of oil flow from the oil receiving means, through the fibrous filter material and out the oil discharging means. A handle is disposed on the canister means to facilitate placement into and out of the housing means.

A further feature of the invention is the specific concentric disposition of evaporation wall members and heat transmitting wall members to both improve the heating characteristics within the evaporation chamber and control the fluid flow therethrough. This includes the use of fluid flow openings in both the evaporation wall and heating wall members. Further, fluid flow gate means are provided in the heating wall members to guide the flow of fluid between each wall member and the vaporizing surface on an adjacent evaporation wall member. The fluid flow is further controlled in a specific embodiment by having the fluid traveling surface inclined downwardly on the evaporation plate means. The heat transmitting means includes a ceiling surface that is inclined upwardly and outwardly from the longitudinal axis of the device.

The structure as specifically disclosed herein provides a labyrinth path or maze which provides an extended period of time within the evaporation chamber for substantially all of the oil being treated. That is, the flow is very carefully controlled and the oil is uniformly treated both with respect to the removal of liquid contaminates by heating and the removal of solid contaminates by controlled flow through the mechanical filtration assembly.

A further feature of the invention is directed to the specific type of sealing member used as a part of the evaporator plate means to control the fluid flow within the device.

Another feature of the invention is the specific configuration of the innermost annular member having an upwardly directed oil introducing surface on which the passageways open from the mechanical filtration zone. The oil introducing surface is inclined inwardly with respect to the centermost portion of the evaporator plate means to effect the directing of substantially all of the oil being treated toward the longitudinal axis of the device.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 4 is a plan view of an evaporator plate made in accordance with this invention;

FIG. 5 is a plan view of a heat transmitting element made in accordance with this invention;

FIG. 6 is a sectional view taken along line VI—VI of FIG. 3; and

FIG. 7 is a perspective view of a filter assembly partially in section showing another feature of the invention.

DESCRIPTION OF SPECIFIC EMBODIMENTS

Figure 1:
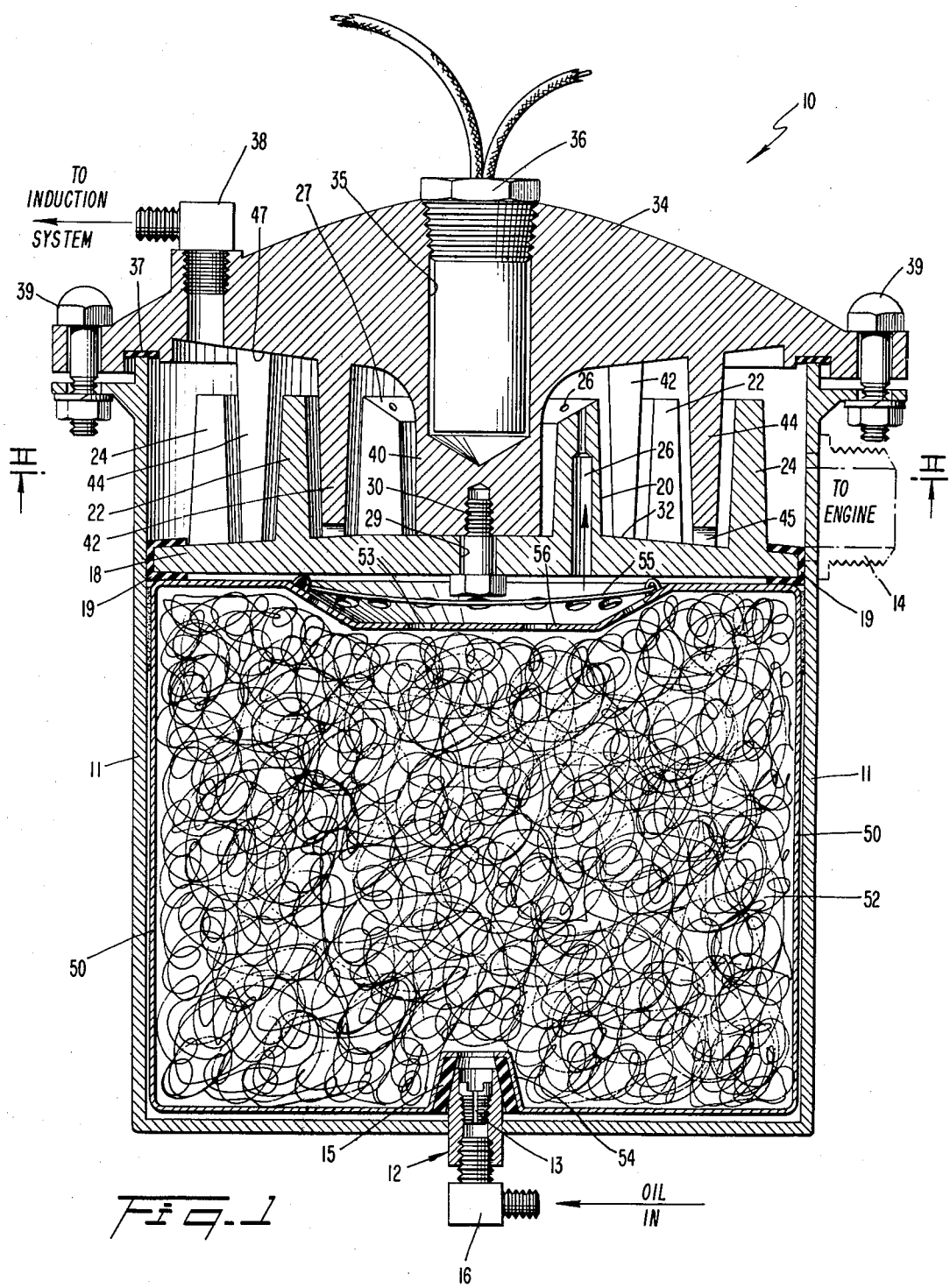
FIG. 1 is a sectional view along line I—I of FIG. 2 through the longitudinal axis of a reclamation device made in accordance with this invention.
Figure 2:
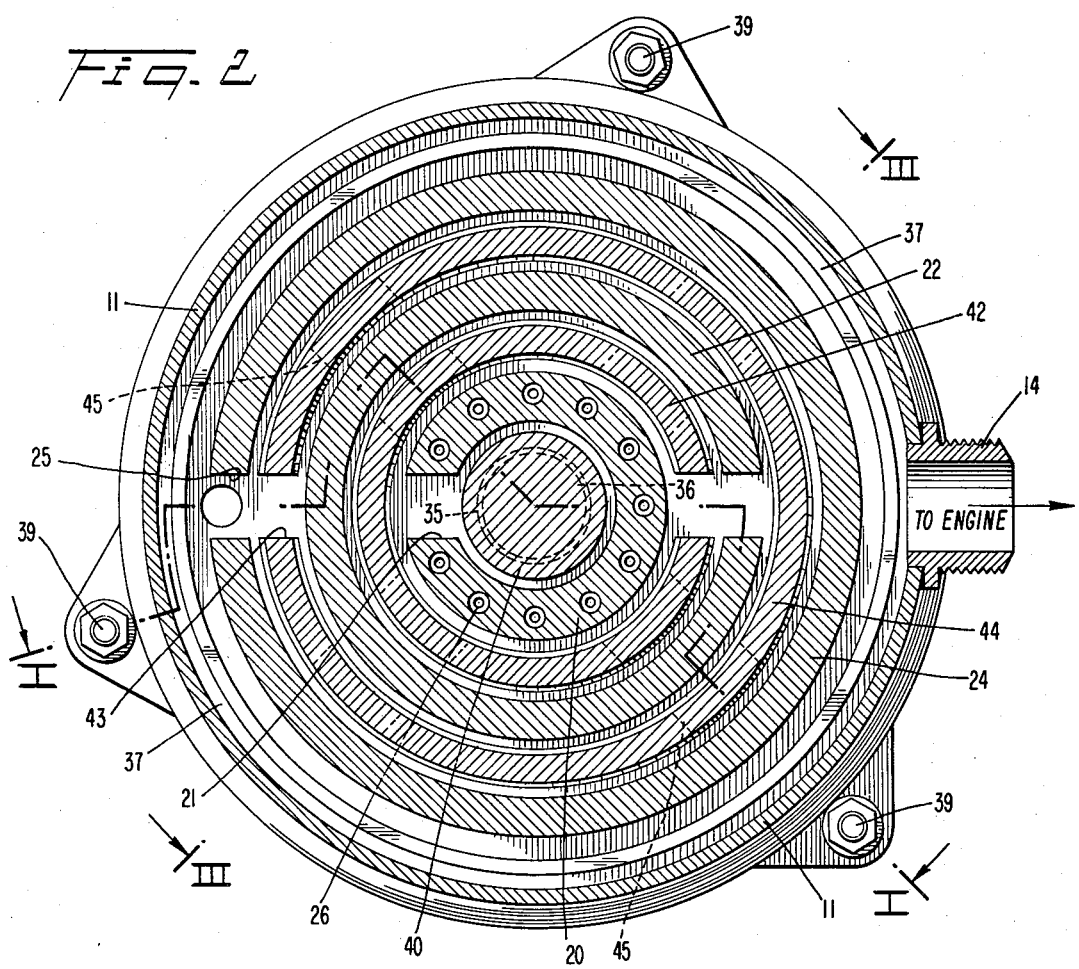
FIG. 2 is a sectional view along line II—II of FIG. 1.
Figure 3:
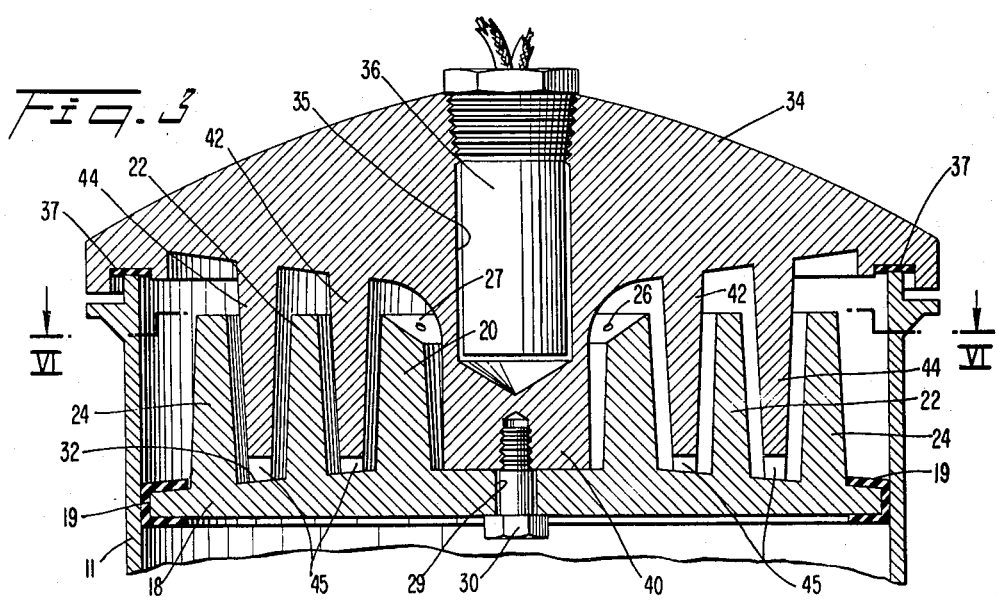
FIG. 3 is a fragmentary sectional view along line III—III of FIG. 2.

The reclamation device, generally designated 10, has a housing 11 having an inlet assembly at the bottom portion thereof and an oil outlet nozzle 14. The oil inlet assembly includes a channel insert element 12 which receives a fitting 16 at one end and a flow nozzle element 13 at the other end thereof. The outer end of the insert element 12 is conically shaped to receive the frusto-conical bushing 15 which serves to seal off fluid flow laterally away from the oil inlet opening. All of the oil received is introduced directly into the filter assembly.

The filter assembly is disposed at one end of the housing 11 and defines a mechanically filtration zone which receives all of the oil coming into the reclamation device 10. The filter assembly includes fibrous filter material 52 contained within a canister 50. This particular configuration is a special feature of this invention. It is understood, however, that various conventional filter mediums and assemblies may be used in combination with other features of the invention as disclosed with respect to the oil reclamation device 10.

The evaporator plate 18 is disposed within housing 11 adjacent the mechanical filtration zone defined by the filtering mechanism. Plate 18 includes a plurality of upwardly projecting evaporation walls 20, 22 and 24 which define a plurality of curved vaporizing surfaces laterally displaced radially with respect to each other. As is evident from the drawings, an upwardly directed vaporizing surface on the innermost annular wall 20 faces inwardly toward the center of the evaporator plate 18. A fluid traveling surface 32 is formed between the spaced vaporizing surfaces of walls 20, 22 and 24.

Plate member 18 has an outer peripheral edge and a sealing member 19 having a U-shaped channel cross-section which envelopes the outer peripheral edge thereof. The annular seal 19 is composed of Buna-N which is an oil resistant rubber. This is an extremely important aspect of the invention since it has been found that in prior art reclamation devices of this type, a considerable amount of the oil to be treated will pass between the inside surface of the housing and the outer peripheral edge of the plate. It is extremely important that all of the oil being treated be brought to the centermost portion of the plate member 18.

In this specific embodiment there are a plurality of annular evaporation wall members 20, 22 and 24 disposed concentrically with respect to each other. The fluid traveling surfaces 32 defined therebetween are, therefore, annular. The wall members 20, 22 and 24 have fluid flow openings 21, 23 and 25, respectively, located along the fluid traveling surface 32. Thus, the longest possible traveling time for the oil from the centermost portion of plate 18 to the oil outlet 14 is attained.

The innermost annular evaporation wall member 20 has a single delimited fluid flow opening 21 at a first location. The next adjacent annular evaporation wall member 22 has a single delimited fluid flow opening 23 at a second location on the plate 18, 180° from the first opening 21 at the first location. In other words, the remaining evaporation wall members 22 and 24, have single delimited fluid flow openings 23 and 25, respectively, following in course at locations 180° with respect to each other. The size of the fluid flow opening is effective to provide a channeled flow while avoiding build up of oil along surface 32. As further shown in this embodiment, the fluid traveling surface 32 is defined along an incline extending downwardly from the centermost portion of the plate 18 toward the housing 11.

Plate 18 also includes passageways 26 which extend from the mechanical filtration zone. Thus, substantially all of the oil is delivered at a centermost portion of plate 18. In this specific embodiment, the innermost annular evaporation wall member 20 includes an upwardly directed oil introducing surface 27. The passageways 26 extend from the mechanical filtration zone and open outwardly along the oil introducing surface 27. Oil introducing surface 27 is inclined inwardly with respect to the centermost portion of plate 18 to effect the directing of substantially all of the oil being treated toward the longitudinal axis of the device 10.

The heating assembly includes a heat transmitting member 34 disposed at the outer end or open end of housing 11. Heat transmitting member 34 is disposed adjacent the evaporator plate 18 to define an evaporation chamber therebetween. Heat transmitting member 34 has downwardly projecting heating wall members 40, 42 and 44 which define a plurality of curved heating surfaces located between the curved vaporizing surfaces of evaporator plate 18.

When fitted in place, as shown in FIG. 1, the heating wall members 40, 42 and 44 and the evaporation wall members 20, 22 and 24 define a plurality of curved paths along the fluid traveling surface 32 from the longitudinal axis outwardly along the evaporator plate 18. Thus, the evaporator wall means 20, 22 and 24 and the heating wall members 40, 42 and 44 provide a structural configuration effective to guide the oil from the centermost portion of plate 18 outwardly along the curved paths to the oil outlet 14. Fluid flow gates 45 allow the fluid to travel as shown by the arrows in FIGS. 5 and 6.

In this specific embodiment, the heating assembly includes the heat transmitting member 34 with the heating wall members 40, 42 and 44, on one side thereof, and a cavity 35 on the other side to receive the heating element 36. The heating element 36 is connected directly to the battery cable of the vehicle by the electrical leads as shown. A heat conducting fluid is contained in the cavity 35 with the heating element 36. Otherwise, it is virtually impossible to get a suitable surface-to-surface contact between the heating element 36 and inside wall of the cavity 35 for conducting heat through the heat transmitting member 34.

Heat transmitting member 34 defines a closure member for the outer end of the housing 11. Nut and bolt assemblies 39 are used to interconnect the closure and the housing in a well known fashion. An appropriate seal 37 is placed between the butting parts to accomplish the desired sealing results. A vent assembly having a fitting 38 is used to allow vapors to escape from the evaporation chamber during the operation of the device 10.

The heat transmitting centerpost member 40 extends downwardly within the innermost annular evaporation wall member 20. Thus, as shown, the centerpost 40 defines a heating surface located adjacent and facing outwardly toward the inwardly facing vaporizing surface of wall member 20. In this specific embodiment, the centerpost member 40 contacts the evaporator plate 18 where it is fixedly attached by bolt 30 projecting through the opening 29 as shown. The remaining heat transmitting walls 42 and 44 are also in contact with the heat fluid traveling surface 32. By this configuration, heat is transmitted via convection and conduction within the evaporation zone.

Heat transmitting member 34 also includes an upper ceiling surface 47 from which the annular walls 42 and 44 extend. Ceiling surface 47 extends along an incline directed upwardly and outwardly from the longitudinal axis of device 10.

A further important feature of this invention is directed to the filter assembly including the canister 50 and fibrous material 52 contained therein. Canister 50 has a bottom end portion, a side wall portion, and an upper end portion as shown. It is composed of a material that is impervious to fluids. Canister 50 has a single inlet opening in an identation 54 specifically fitted over the shaped bushing 15. The oil discharging mechanism is located in the upper end portion of canister 50. A depression 56, in the upper end portion, is effective to make room for the handle 55 and the disposition of the nut 30 immediately above the mechanical filtration zone. Openings 53, located in the upper end portion of canister 50, enable substantially all of the oil to be directed toward the center longitudinal axis of device 10. Handle 55 facilitates the handling of canister 50 into and out of housing 11. A felt pad 51 disposed around the outer periphery of canister 50, helps to control fluid flow and prevent displacement of canister 50 within housing 11.

Both the filter assembly and the evaporation chamber as disclosed herein, form unique structural configurations which may be used separately or in combination with respect to each other. They may also be used separately with other prior art mechanisms to accomplish significant improvements over prior art oil reclamation devices.

While the oil reclamation device has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An oil reclamation device having a longitudinal axis and comprising:
   (a) a housing means, filter means, evaporator plate means and heating means,
   (b) said evaporator plate means including upwardly projecting evaporation wall means defining a fluid traveling surface and an upwardly disposed vaporizing surface facing inwardly toward the center of the evaporator plate means,
   (c) said heating means including downwardly projecting centerpost means defining a heating surface located adjacent and facing outwardly toward the inwardly facing vaporizing surface,
   (d) said evaporation wall means defining a curved path along the fluid traveling surface outwardly from said longitudinal axis along said evaporator plate means,
   (e) said evaporator plate means including passageway means extending from the filter means to deliver substantially all of the oil being treated inwardly along the inwardly facing vaporizing surface toward the longitudinal axis and toward the centerpost means,
   (f) said fluid traveling surface having a structural configuration effective to guide the oil from said centerpost means outwardly along said curved paths to an oil outlet means in the housing.

2. A device as defined in claim 1 wherein
said heating means includes a heating element and a heat transmitting member,
said heat transmitting member includes said centerpost means on one side thereof and a cavity on the other side of said member to receive said heating element.

3. A device as defined in claim 2 wherein
the heating means includes a heat conducting material contained in the cavity with the heating element.

4. A device as defined in claim 3 wherein said material is a heat conducting fluid.

5. A device as defined in claim 1 wherein
the evaporation wall means includes a plurality of annular evaporation wall members disposed concentrically with respect to each other defining annular fluid traveling surfaces therebetween,
said annular wall members having fluid flow openings located along the fluid traveling surface to provide the longest possible traveling time for the oil from said centerpost means to said oil outlet means.

6. A device as defined in claim 1 wherein
said evaporation wall means includes an innermost annular evaporation wall member including said vaporizing surface and having a delimited fluid flow opening which directs fluid flow along the fluid traveling surface outwardly from said centerpost means.

7. A device as defined in claim 1 wherein the fluid traveling surface is defined along an incline extending downwardly from the centerpost means of the evaporator plate means toward the housing means.

8. An oil reclamation device having a longitudinal axis and comprising:
   (a) a housing means, filter means, evaporator plate means and heating means,
   (b) said evaporator plate means including upwardly projecting evaporation wall means defining a fluid traveling surface and an upwardly disposed vaporizing surface facing inwardly toward the center of the evaporator plate means,
   (c) said heating means including downwardly projecting centerpost means defining a heating surface located adjacent and facing outwardly toward the inwardly facing vaporizing surface,
   (d) said evaporation wall means defining a curved path along the fluid traveling surface outwardly from said longitudinal axis along said evaporator plate means,
   (e) said evaporator plate means including passageway means extending from the filter means to deliver substantially all of the oil being treated inwardly along the inwardly facing vaporizing surface toward the longitudinal axis and toward the centerpost means,
   (f) said fluid traveling surface having a structural configuration effective to guide the oil from said centerpost means outwardly along said curved paths to an oil outlet means in the housing,
   (g) the evaporation wall means includes a plurality of annular evaporation wall members disposed concentrically with respect to each other defining annular fluid traveling surfaces therebetween,
   (h) said annular wall members having fluid flow openings located along the fluid traveling surface to provide the longest possible traveling time for the oil from said centerpost means to said oil outlet means,
   (i) the heating means includes a plurality of heating wall members disposed concentrically with respect to each other,
   (j) said heating wall members projecting downwardly between the evaporation wall members.

9. A device as defined in claim 8 wherein
the heating wall members extend downwardly by an amount sufficient to contact the fluid traveling surface on the evaporator plate means,
said heating wall members including fluid flow gate means to guide the flow of fluid between each wall member and a vaporizing surface on an adjacent evaporation wall member.

10. A device as defined in claim 1 wherein
the evaporator wall means including an innermost annular evaporation wall member having an upwardly directed oil introducing surface,
said passageway means extend from the filter means and open outwardly along the oil introducing surface.

11. A device as defined in claim 10 wherein
the oil introducing surface is inclined inwardly with respect to said centerpost means to effect the directing of substantially all of the oil being treated toward said longitudinal axis, and
the centerpost means extends downwardly within said innermost annular evaporation wall member.

12. A device as defined in claim 11 wherein
the evaporation wall means includes a plurality of annular evaporation wall members disposed concentrically with respect to each other defining annular fluid traveling surfaces therebetween,
there is an innermost annular evaporation wall member having an upwardly directed oil introducing surface,
said passageway means extend from the filter means and open outwardly along the oil introducing surface,
the centerpost means extends downwardly within said innermost annular evaporation wall member.

13. A device as defined in claim 1 wherein
the evaporator plate means includes a plate member having an outer periphery and sealing means along the entire said periphery to prevent bypassing of fluids between the plate member and housing means.

14. A device as defined in claim 13 wherein
the sealing means has a U-shaped cross-section which envelopes the outer peripheral edge of the plate member.

15. A device as defined in claim 1 wherein
said heating means includes a heat transmitting member defining a closure member for said outer end of the housing means,
said heat transmitting member includes said centerpost means and vent means for vapors to escape from the evaporation chamber.

16. The device as defined in claim 1 wherein
said heating means includes a heat transmitting member having an upper ceiling surface in the evaporation chamber and the centerpost means extends downwardly from the ceiling surface,
said ceiling surface extends along an incline directed upwardly and outwardly from said longitudinal axis.

17. The device as defined in claim 1 wherein
the centerpost means comprises a single centerpost member extending downwardly to contact said evaporator plate means.

18. The device as defined in claim 17 wherein
the evaporator plate means is fixedly mounted to the centerpost member.

19. The device as defined in claim 1 wherein
said filter means includes fibrous filter material disposed within a canister means,
said canister means having a structural configuration to removably fit into the housing means and receive substantially all of the oil to be treated entering the device through said oil inlet means.

20. The device as defined in claim 19 where
the canister means has a bottom end portion, a side wall portion and an upper end portion,
said canister means includes means for receiving oil at the bottom end portion and means for discharging oil from the fibrous filter material at the upper end portion.

21. The device as defined in claim 20 wherein
said oil receiving means of the canister means is a single opening disposed around the oil inlet means of the housing means,
said oil discharging means of the canister means includes at least one opening located in said upper end portion,
said canister means being composed of a fluid impervious material to provide the only path of oil flow therethrough from the oil receiving means, the fibrous filter material and the oil discharging means.

22. The device as defined in claim 21 wherein
said canister means includes a handle means to facilitate the handling of the canister means into and out of the housing means.

* * * * *